(12) United States Patent
Suwazono

(10) Patent No.: US 6,837,195 B2
(45) Date of Patent: Jan. 4, 2005

(54) V-ENGINE SUPERCHARGING DEVICE

(75) Inventor: Kazutoshi Suwazono, Gunma (JP)

(73) Assignee: Ogura Clutch Co., Ltd. (JP)

( * ) Notice: Subject to any disclaimer, the term of this patent is extended or adjusted under 35 U.S.C. 154(b) by 0 days.

(21) Appl. No.: 10/490,788

(22) PCT Filed: Sep. 25, 2002

(86) PCT No.: PCT/JP02/09820
§ 371 (c)(1),
(2), (4) Date: Mar. 24, 2004

(87) PCT Pub. No.: WO03/027457
PCT Pub. Date: Mar. 4, 2003

(65) Prior Publication Data
US 2004/0206339 A1 Oct. 21, 2004

(30) Foreign Application Priority Data
Sep. 26, 2001 (JP) ........................................ 2001-292948

(51) Int. Cl.$^7$ .............................................. F02B 75/22
(52) U.S. Cl. .................................. 123/54.4; 123/559.1
(58) Field of Search ............................... 123/54.4, 58.7, 123/54.1, 559.1, 559.2, 563, 195 R

(56) References Cited

U.S. PATENT DOCUMENTS 4,656,992 A * 4/1987 Oonaka et al. .......... 123/559.3

FOREIGN PATENT DOCUMENTS

| JP | 61-005330 U | 1/1986 |
| JP | 05-001562 A | 1/1993 |
| JP | 10-103073 A | 4/1998 |

* cited by examiner

Primary Examiner—Bibhu Mohanty
(74) Attorney, Agent, or Firm—Irell & Manella LLP

(57) ABSTRACT

A rotor housing (2) has flanges (8) projecting to two sides in the directions of axes of rotors and having suction flow outlets for suction pipes (33) which are integrally connected to the rotor housing (2). The rotor housing (2), a collector housing (21), and the suction pipes (33) are integrally formed of aluminum alloy casting. The lower surfaces of the flanges (8) of the rotor housing (2) are used as attaching surfaces to be attached to the upper surface of a cylinder head.

6 Claims, 6 Drawing Sheets

V-ENGINE SUPERCHARGING DEVICE

BACKGROUND OF THE INVENTION

The present invention relates to a supercharging device arranged between the left and right banks of a V-engine and mounted on the upper surface of a cylinder head.

As a conventional supercharging device, one shown in FIGS. 1 to 5 of Japanese Patent Laid-Open No. 10-103073 (reference 1) is typical. The supercharging device described in reference 1 has a rotor housing accommodating a pair of rotors parallel to the crank shaft of a V-engine. The rotor housing has an intake port open to the rear side and connected to a throttle chamber, a discharge port open to its upper portion, and a bypass channel through which part of the pressurized air discharged from the discharge port is circulated to the intake port. A butterfly valve operated by an actuator is provided to a bypass intake port.

In the conventional supercharging device, a plurality of suction pipes are arranged to surround the side portion of the rotor housing, and the rotor housing and suction pipes are formed integrally. A collector housing is placed over the upper portion of the rotor housing where the discharge port and the suction flow inlets of the suction pipes are formed. The collector housing and suction pipes are fixed integrally with a plurality of bolts. A collector cover is placed over an opening in the upper portion of the collector housing, and is fixed to it.

In the conventional supercharging device having the above arrangement, power transmitted through a pulley and gear box rotates a pair of rotors in the rotor housing in synchronism with each other in opposite directions. The intake air drawn through the intake port is pressurized and discharged into the collector housing through the discharge port, flows through the suction pipes, and is supplied to the suction ports of a cylinder head.

The supercharging device shown in FIGS. 8 to 10 of reference 1 has a rotor housing, a suction pipe, and a collector housing having left and right collectors. The supercharging device also has a pair of cores accommodating intercoolers (heat exchangers) respectively, a cooler housing having discharge ports formed in the two sides of the rear portion and two sides of the front portion, and bypass pipes through which the discharge ports of the cooler housing and the left and right collectors communicate with each other.

In the conventional supercharging device having the above arrangement, the pressurized intake air discharged from the discharge port of the rotor housing flows into the cooler housing through a bypass pipe formed in the collector housing, and is cooled as it flows through the left and right intercoolers. The cooled pressurized air is distributed into the left and right collectors in the collector housing through the bypass pipe, and is supplied to the suction port of the cylinder head from the respective suction pipes.

When a bypass valve is opened by a bypass opening/closing actuator, part of the pressurized intake air discharged from the discharge port of the rotor housing flows through the bypass channel in the collector housing and is introduced to the intake port side of the rotor housing from the bypass intake port. Thus, the supercharging pressure of the discharge port side is adjusted.

In an engine having a supercharging device, as described in, e.g., Japanese Patent Laid-Open No. 2001-82160 (reference 2), a secondary air pipe is attached to the downstream of the supercharging device. Part of the pressurized intake air is supplied to the respective exhaust ports through an air channel formed in the cylinder head. Thus, no air pump for purifying the exhaust gas is required.

In the supercharging device described in reference 1, the rotor housing is formed inside the suction pipes. Thus, when the suction pipes integrally formed with the rotor housing by aluminum alloy casting are mounted on the cylinder head, the vibration of the supercharging device and engine acts on the connecting portion of the rotor housing and suction pipes to form a crack, posing a problem in terms of durability.

In the engine having the supercharging device described in reference 2, the secondary air pipe through which the suction pipe and air channel communicate with each other extends from the side portion to the bottom of the supercharging device. With this piping structure of the secondary air pipe, sometimes the supercharging device cannot be mounted on the cylinder head unless the layout of other auxiliary machinery components is changed.

In the supercharging device described in reference 1, the butterfly valve is built in the bypass channel formed in the rotor housing. Due to the layout of the engine, however, sometimes a space for building in the butterfly valve cannot be formed in the supercharging device. Also, it is difficult to mount the actuator for driving the butterfly valve on the outside of the supercharging device. If the butterfly valve is built in the supercharging device, the number of steps of machining the rotor housing, the number of components of the valve mechanism, and the number of the assembling steps of the valve mechanism increase. Thus, the cost of the supercharging device cannot be decreased.

In the supercharging device described in reference 1, since a suction system channel is formed to distribute the pressurized intake air, discharged from the rotor housing to the collector, into a plurality of suction ports of the cylinder head, the flow of the pressurized intake air to the respective suction ports changes over time. For example, in the case of a V6 engine, the number of suction ports that take air simultaneously is two. More specifically, when a relief valve is built in the conventional supercharging device, as the positive pressure of the collector is not constant, (if the positive pressure and negative pressure are extremely different) an erroneous operation may occur. If the pressurized and heated intake air is introduced to the intake port, the supercharging efficiency decreases.

It is an object of the present invention to provide a V-engine supercharging device in which the durability of the housing is improved.

It is another object of the present invention to provide a V-engine supercharging device that can be mounted on a cylinder head without largely changing the layout of the engine.

It is still another object of the present invention to provide a V-engine supercharging device in which the reliability of the operation of the relief valve is improved.

SUMMARY OF THE INVENTION

In order to achieve the above objects, according to the present invention, there is provided a V-engine supercharging device disposed between banks of a V-engine and mounted on a cylinder head having a suction port, comprising a rotor housing which accommodates a pair of rotors and has a discharge port in an upper portion thereof, a substantially box-shaped collector housing having a suction flow inlet connected to the discharge port of the rotor housing, a collector communicating with an interior of the rotor housing through the suction flow inlet, and an upper opening, a plurality of suction pipes which are arranged on two sides of the rotor housing in directions of axes of the rotors at a predetermined distance and through which the collector and the suction port of the cylinder head communicate with each other, a collector cover which covers the upper opening of the collector housing, and flanges projecting to two sides of the rotor housing in the directions of axes of the rotors and integrally connected to suction flow outlets of the suction pipes, wherein the rotor housing, collector housing, and suction pipes are integrally formed by aluminum alloy casting, and lower surfaces of the flanges are attached to an upper surface of the cylinder head.

DETAILED DESCRIPTION OF THE PREFERRED EMBODIMENT

The present invention will be described in detail with reference to the accompanying drawings.

Figure 1:
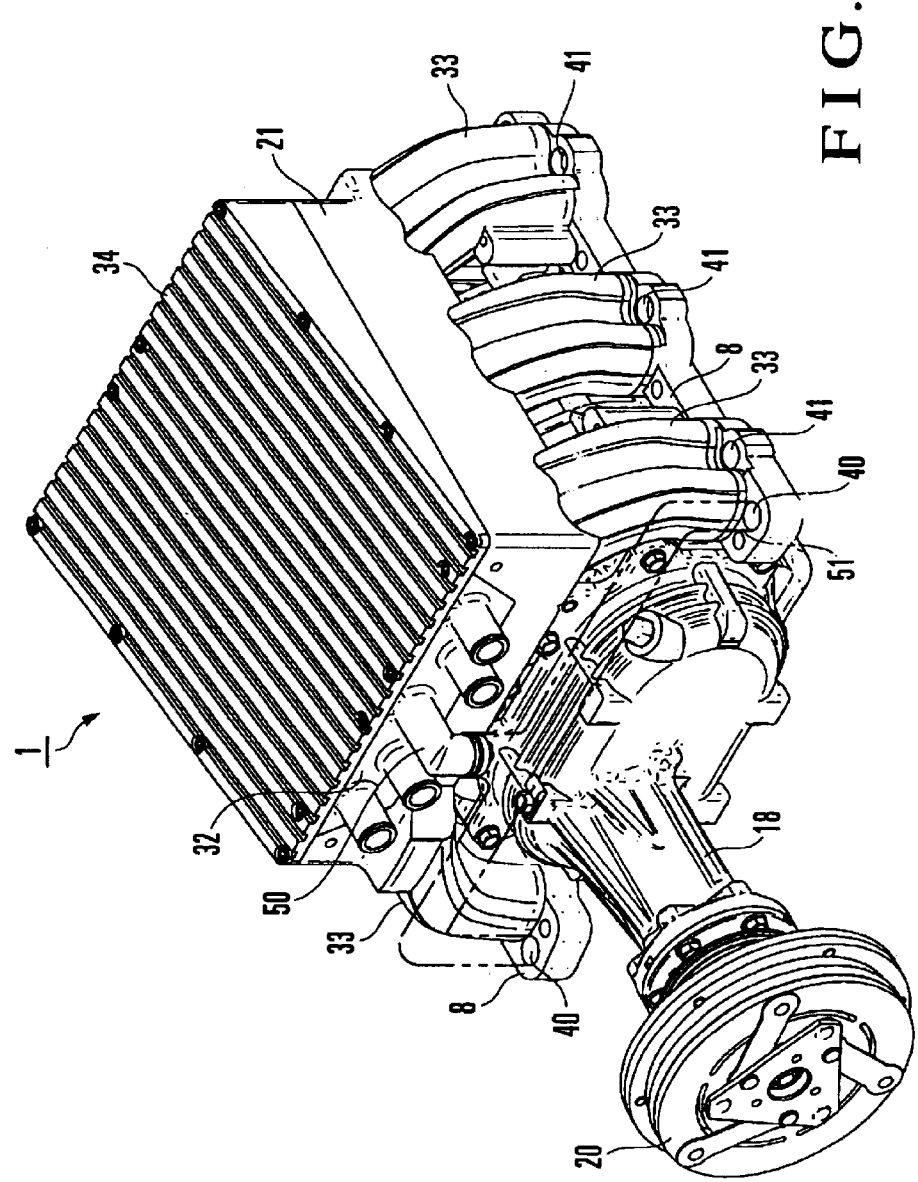
FIG. 1 is a perspective view of a V-engine supercharging device according to an embodiment of the present invention.
Figure 2:
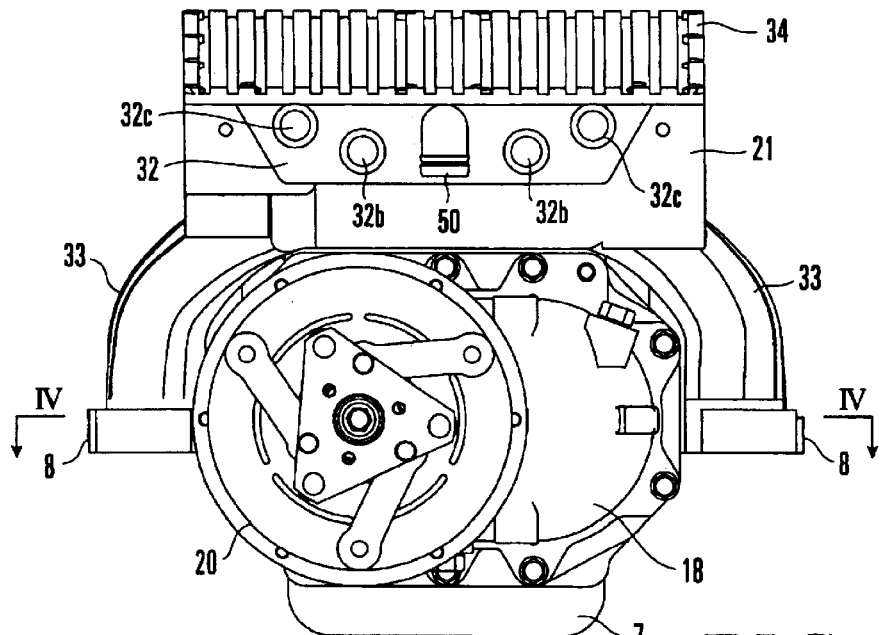
FIG. 2 is a front view of the supercharging device shown in FIG. 1.
Figure 3:
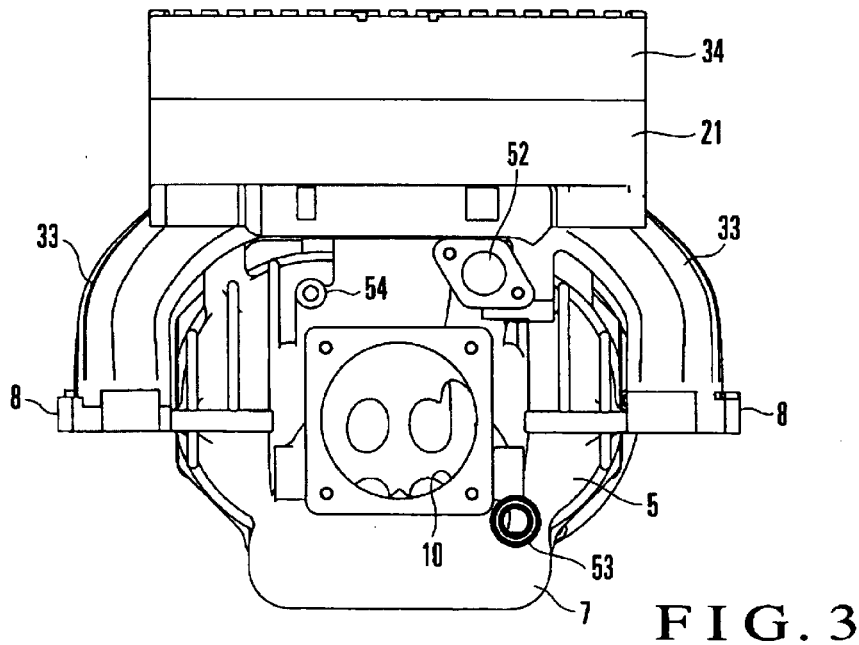
FIG. 3 is a rear view of the supercharging device shown in FIG. 1.
Figure 4:
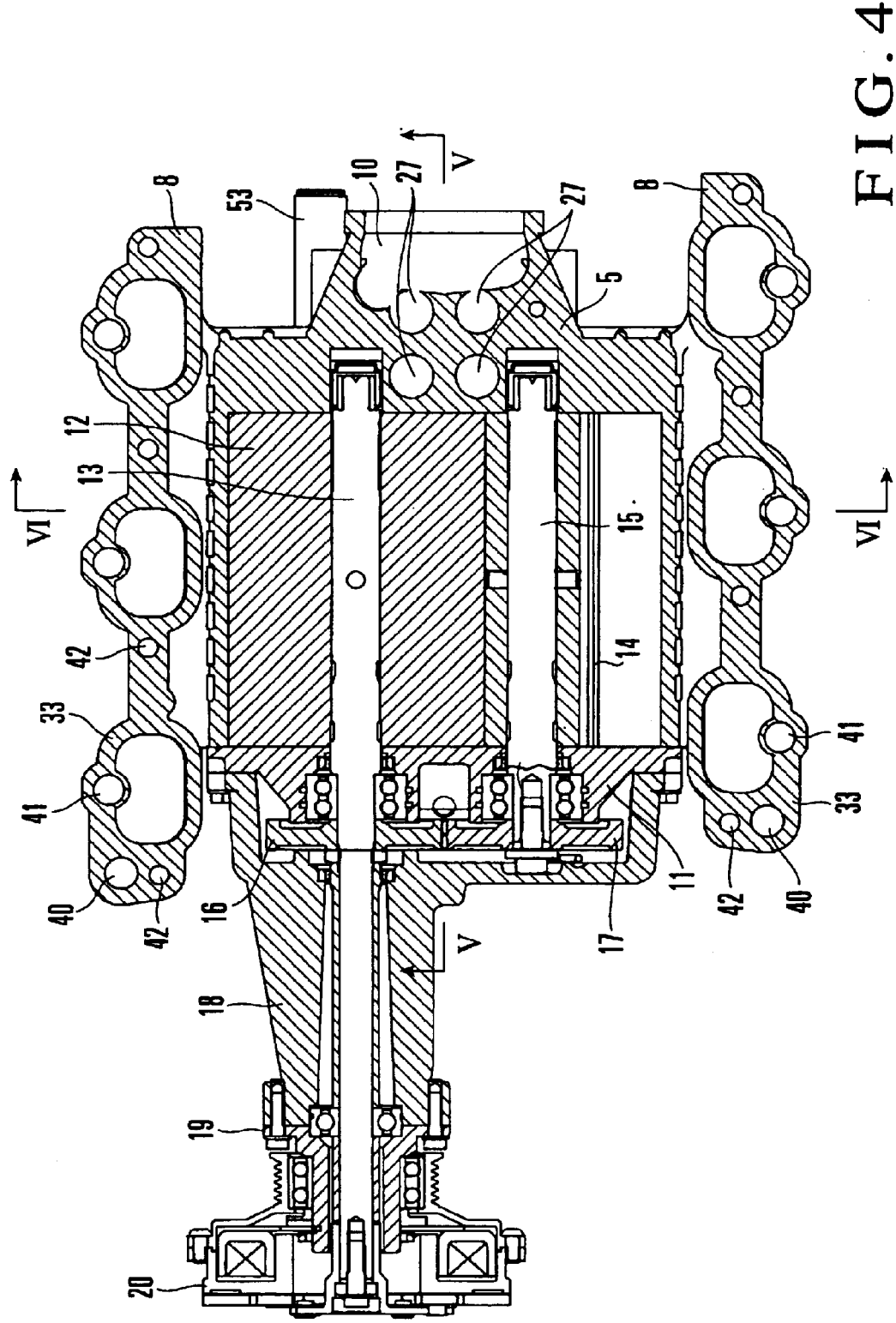
FIG. 4 is a sectional view taken along the line IV—IV of FIG. 2.
Figure 5:
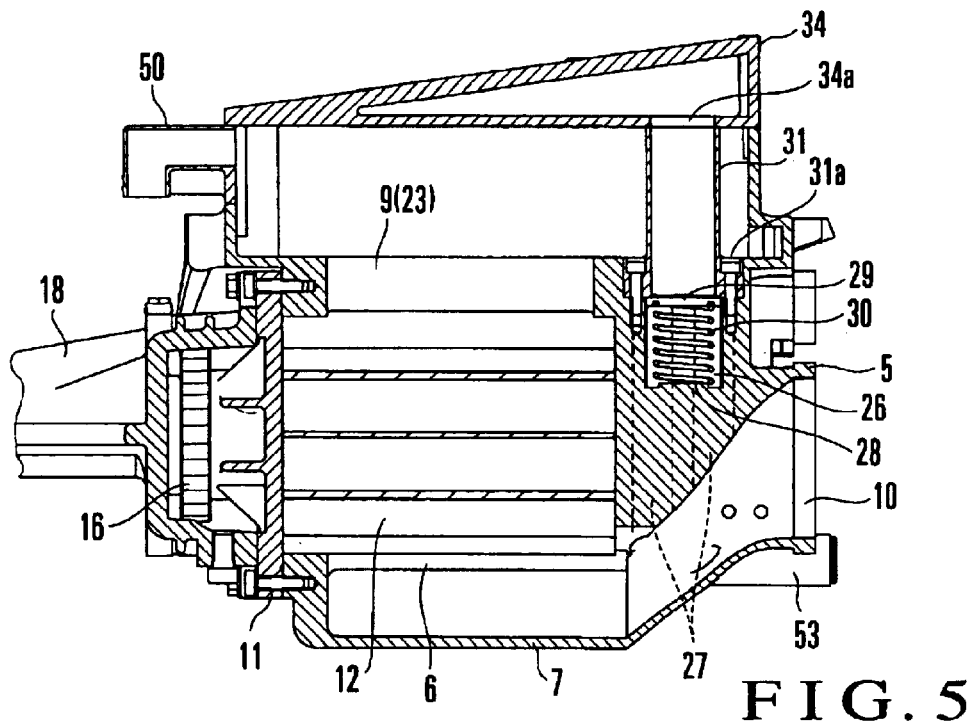
FIG. 5 is a sectional view taken along the line V—V of FIG. 4.
Figure 6:
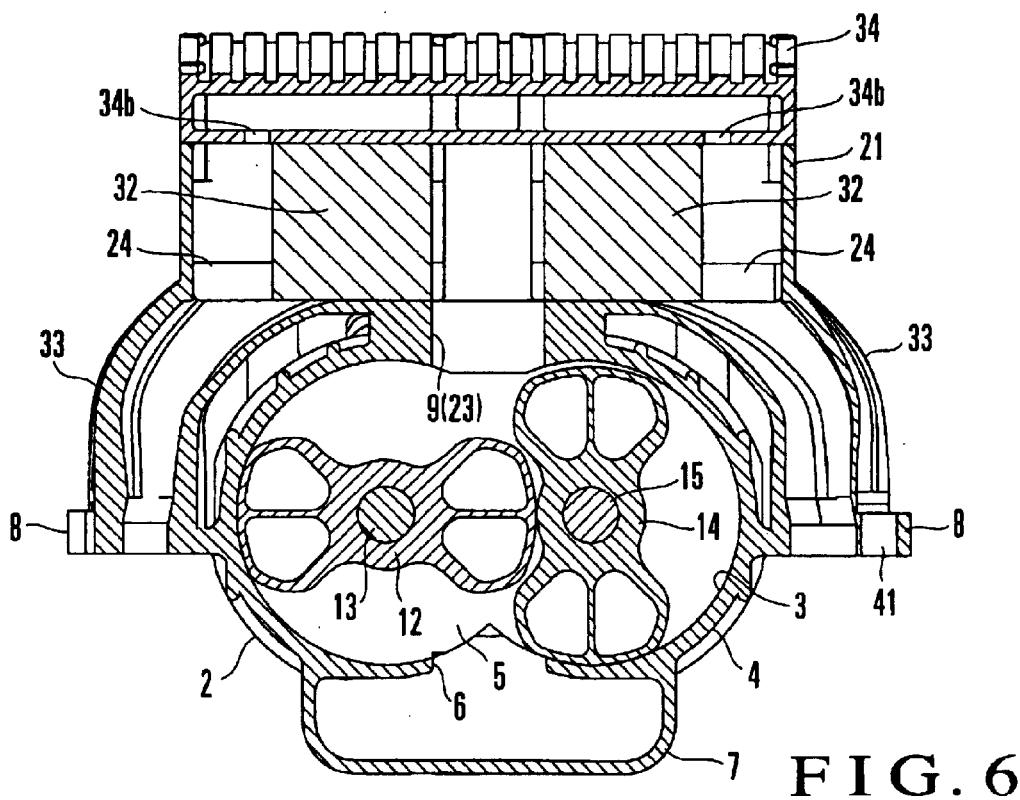
FIG. 6 is a sectional view taken along the line VI—VI of FIG. 4.

FIGS. 1 to 10C show a V-engine supercharging device according to an embodiment of the present invention. In this embodiment, as a V-engine supercharging device, a mechanical roots blower which is driven by the power from a crank shaft is shown. As shown in FIGS. 1, 2, and 6, a supercharging device 1 according to this embodiment has a housing in which a rotor housing 2, collector housing 21, and six suction pipes 33 are integrally manufactured by aluminum alloy casting, and a collector cover 34 which closes the upper opening of the collector housing 21 and is manufactured by aluminum alloy casting. As shown in FIGS. 4 and 5, the supercharging device 1 also has a front housing 11 which closes the front-side opening of the rotor housing 2, and a nose pipe 18 disposed on the front side of the front housing 11 and fixed to the rotor housing 2 with bolts.

As shown in FIG. 6, the rotor housing 2 has a circumferential wall 4 which forms a rotor accommodating portion 3 for accommodating a pair of rotors 12 and 14, a rear wall 5 (FIG. 4) which closes the rear side of the circumferential wall 4, a suction flow inlet 6 formed in the lower portion of the circumferential wall 4 in the axial directions of the rotors, a substantially flat hollow tubular wall 7 formed to cover the outside of the suction flow inlet 6, a pair of flanges 8 (FIG. 1), each having a substantially rectangular shape formed of short sides projecting in a direction to separate from the outer surface of the circumferential wall 4 and long sides extending in the axial directions of the rotors, and having lower surfaces serving as attaching surfaces, a discharge port 9 open to the upper portion of the circumferential wall 4 in the axial directions of the rotors, and an intake port 10 (FIG. 5) formed in the rear wall 5 and to be connected to a throttle chamber (not shown).

As shown in FIG. 4, the front-side opening of the rotor housing 2 is closed by the front housing 11 formed with a pair of bearing holders. In the rotor housing 2, a driving shaft 13 on which the driving rotor 12 is mounted and a driven shaft 15 on which the driven rotor 14 is mounted are rotatably supported by the rear wall 5 and front housing 11 through bearings. A driving gear 16 is mounted on the driving shaft 13 projecting from the front housing 11 further toward the front side, and a driven gear 17 is mounted on the shaft end of the driven shaft 15 projecting from the front housing 11 further toward the front side. The driving gear 16 and driven gear 17 mesh with each other to rotate the rotors 12 and 14 in synchronism with each other in opposite directions.

The nose pipe 18 fixed to the rotor housing 2 through the front housing 11 to close the outer sides of the pair of gears 16 and 17, and an extension pipe 19 fixed to the distal end of the nose pipe 18 are disposed on the front side of the rotor housing 2. The driving shaft 13 extends through the nose pipe 18 and extension pipe 19 such that its distal end projects from the extension pipe 19. An electromagnetic clutch 20 is attached around the distal end of the driving shaft 13.

The electromagnetic clutch 20 is constituted by an armature assembly (a hum, leaf spring, and armature) mounted on the driving shaft 13, a pulley rotatably supported by the extension pipe 19, an annular rotatable member having a substantially U-shaped section and fixed to the pulley, a yoke which accommodates an excitation coil supported by the extension pipe 19, and the like. A belt (not shown) extends between a pulley (not shown) mounted on a crank shaft (not shown) and the pulley of the electromagnetic clutch 20, so that power is transmitted.

Figure 7:
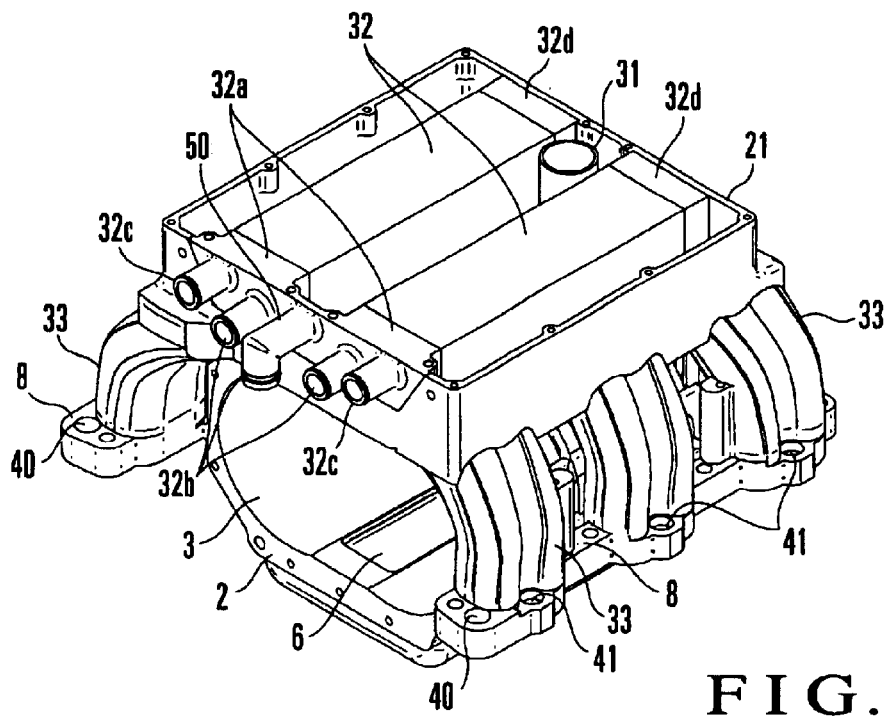
FIG. 7 is a perspective view of a housing that accommodates intercoolers.
Figure 8:
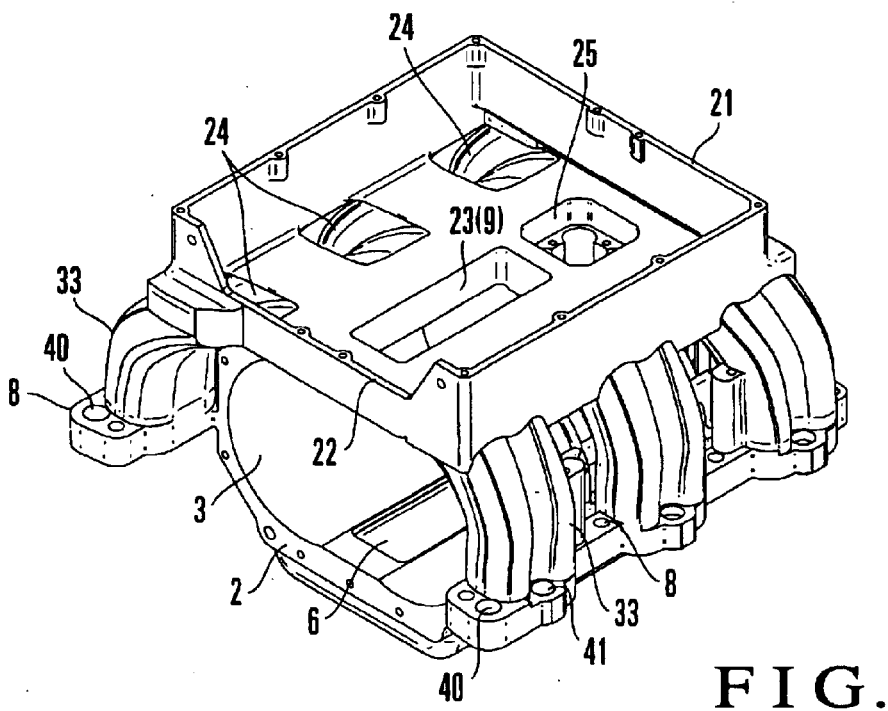
FIG. 8 is a perspective view of the housing from which the intercoolers and a bypass pipe member are removed.

The substantially box-shaped collector housing 21, part of the bottom of which is formed of the circumferential wall of the rotor housing 2, is arranged on the rotor housing 2. As shown in FIGS. 7 and 8, a recess 22 is formed in the wall of the collector housing 21 having an interior serving as a collector portion. Front-side tanks 32a of intercoolers (heat exchangers) 32 are to be mounted to the front side of the recess 22. A suction flow inlet 23 connected to the discharge port 9 of the rotor housing 2, six suction flow outlets 24 formed in those two ends of the rotor housing 2 which project to the left and right (in directions perpendicular to the axes of the rotors) from the circumferential wall 4, and a recessed relief valve assembly portion 25 formed on the rear side of the suction flow inlet 23, are formed in the bottom of the collector housing 21.

Figure 9:
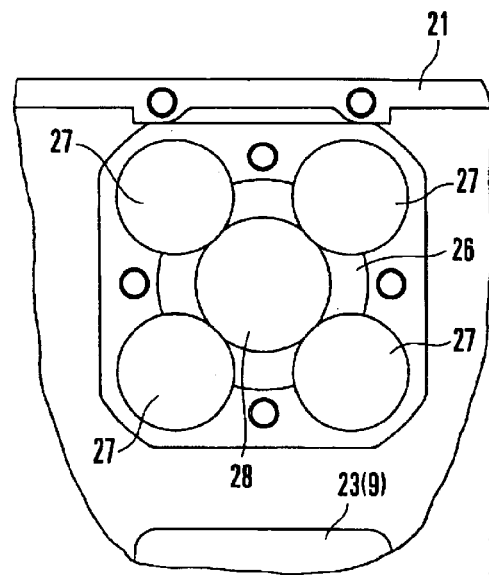
FIG. 9 is a plan view of the main part of the bottom of a collector housing.

The relief valve assembly portion 25 is formed of a square recessed portion. As shown in FIG. 9, a bottomed central hole 26 obtained by machining the rear wall 5 of the rotor housing 2, and four through holes 27 formed around the central hole 26 by machining and extending to the intake port 10, are formed in the bottom of the recessed portion. The four through holes 27 are formed as second bypass channels. Reference numeral 28 denotes a spring washer formed on the bottom of the central hole 26.

As shown in FIG. 5, a circular disk-like relief valve 29 vertically movable with respect to the circumferential wall of the central hole 26 as a guide surface, and a coil spring 30 interposed between the relief valve 29 and spring washer 28 are built in the central hole 26. A square bypass pipe member 31, provided with a cylindrical base 31a and having an outer surface to fit in the circumferential wall of the recessed portion and an inner surface having a radius smaller than that of the central hole 26, is arranged in the relief valve assembly portion 25.

The base 31a of the bypass pipe member 31 is fitted in the recessed portion and is fixed to it with screws. Thus, the relief valve 29 biased by the coil spring 30 abuts against the lower surface of the base 31a, so that the bypass intake ports of the second bypass channels are closed. When the relief valve 29 is pushed down by the supercharged pressure against the biasing force of the coil spring 30, the bypass intake ports of the second bypass channels are opened.

The collector housing 21 accommodates the pair of water-cooled intercoolers 32, as shown in FIG. 7. The water-cooled intercoolers 32 are heat exchangers in which pressurized suction air channels having inner fins and cooling water channels having flat pipes are stacked. Supply ports 32b of the front tanks 32a of the intercoolers 32 are connected to a radiator (not shown) through hoses, and exhaust ports 32c of the front tanks 32a are connected to a water tank (not shown) through hoses. The water tank and radiator are connected to each other through a hose. A pump is provided between the radiator and the supply ports 32b.

In each intercooler 32, the cooling water supplied to the front tanks 32 flows to a rear tank 32d through a flat pipe, and the cooling water circulates from the rear tank 32d to the front tank 32b through a flat pipe. Reference numeral 50 denotes an attaching port integrally formed with the front tanks 32a of the intercoolers 32. A secondary air supply pipe 51 indicated by an imaginary line in FIG. 1 is attached to the attaching port 50.

The six suction pipes 33, extending on the left and right outer sides of the circumferential wall 4 of the rotor housing 2 toward the flanges 8 of the rotor housing 2, are integrally formed with the left and right bottom portions of the collector housing 21. The suction flow outlets of the respective suction pipes 33 are integrally connected to the rotor housing 2 through the flanges 8 of the rotor housing 2. A gap is formed between the suction pipes 33 and circumferential wall 4. Secondary air channels 40, to which the secondary air supply pipe 51 extending to the outside above the nose pipe 18 is to be connected through valve means (not shown), are formed in the front sides of the left and right flanges 8. The secondary air channels 40, are connected to the air channel of the cylinder head (not shown).

A plurality of attaching holes 41 to which injectors (not shown) are to be attached are formed in the left and right flanges 8. The attaching holes 41 are formed around the suction flow outlets of the suction pipes 33. A plurality of insertion holes 42 (four in each flange 8) in which attaching bolts are to be inserted are formed in the left and right flanges 8.

Figures 10A, 10B, 10C:
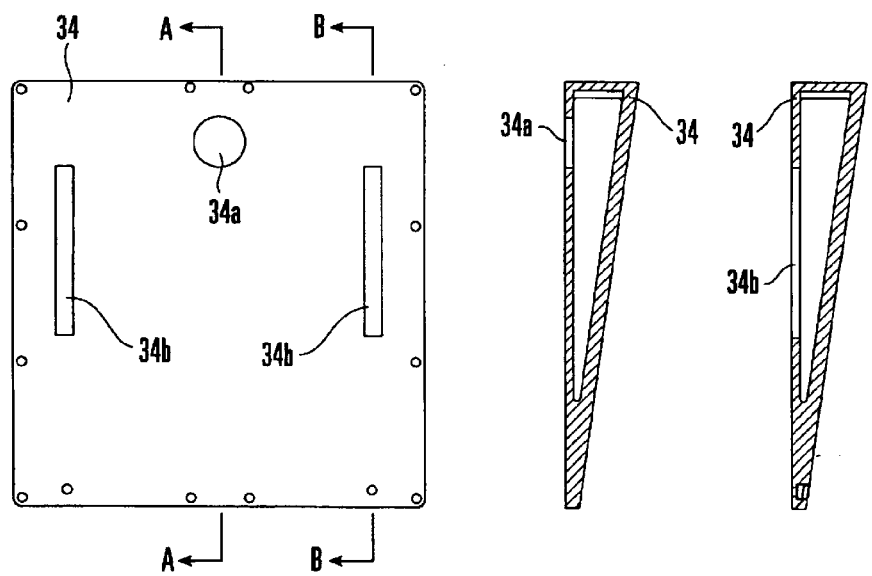
FIG. 10A is a bottom view of a collector cover.
FIG. 10B is a sectional view taken along the line A—A of FIG. 10A.
FIG. 10C is a sectional view taken along the line B—B of FIG. 10A.

As shown in FIG. 5, the collector cover 34 having a right-angled triangular side surface and an interior serving as the first bypass channel is placed on the opening in the upper portion of the collector housing 21. Heat-radiating fins formed of projections extending in the axial directions of the rotors are formed on the surface of the collector cover 34. As shown in FIGS. 10A to 10C, the collector cover 34 has, in its lower surface, a bypass discharge port 34a which is formed at the central portion in a direction perpendicular to the axes of the rotors and to be connected to the opening in the upper portion of the bypass pipe member 31, and bypass intake ports 34b which are formed in the two ends in a direction perpendicular to the axes of the rotors and into which part of the pressurized intake air flowing through the intercoolers 32 flows.

Referring to FIG. 3, reference numeral 52 denotes an EGR connecting portion which recirculates part of the exhaust air as intake air so that the exhaust gas is reduced. Reference numeral 53 denotes a brake booster connecting portion which aids the force necessary for stepping on the brake by utilizing the negative pressure. Reference numeral 54 denotes a fuel pump auxiliary connecting portion which aids fuel injection by utilizing the negative pressure.

This embodiment exemplifies the collector cover 34 which has a right-angled triangular side surface so that it will not interfere with other members in terms of the layout of the engine. Alternatively, the collector cover 34 may have a rectangular parallelepiped shape. Although the attaching port 50 of the secondary air supply pipe 51 is integrally formed with the front tanks 32a of the intercoolers 32, the present invention is not limited to this. For example, the two front tanks 32a may be formed separately. The wall of the collector housing 21 may be arranged between the front tanks 32a. A screw hole may be formed in the wall, and an L-shaped pipe as an attaching port: may be screwed in it.

The supercharging device having the above arrangement is disposed between the left and right banks of the V-engine, and is mounted on the cylinder head. At this time, the intake port 10 is connected to the throttle chamber. The respective suction pipes 33 are connected to the suction ports of the cylinder head. The secondary air channels 40 are connected to the air channel of the cylinder head. A belt extends between the pulley of the electromagnetic clutch 20 and the pulley of the crank shaft. In this state, when the electromagnetic clutch 20 is turned on, the pressurized intake air is discharged to the collector (surge tank) in the collector housing 21 by the pair of rotors 12 and 14. The pressurized and heated intake air is cooled by the intercoolers, is distributed, and is supplied to the intake ports through the respective suction pipes 33.

If a large difference is generated between the intake air pressure of the intake port 10 and the intake air pressure introduced to the collector cover 34, the relief valve 29 is pushed downward, and the pressurized intake air flows to the intake port 10 through the first, second, and third bypass channels. When the valve means (not shown) is opened, the pressurized intake air flows through the secondary air supply pipe 51, is supplied to the air channel of the cylinder head, and is discharged from the exhaust port.

As described above, according to the present invention, the suction flow outlets of the suction pipes are integrally connected to the rotor housing through the flanges of the rotor housing which project from the left and right sides of the rotor housing and extend in the axial directions of the rotors. The lower surfaces of the flanges of the rotor housing serve as the attachment surfaces which are to be attached to the upper surface of the cylinder head. Thus, the rotor housing can be attached to the cylinder head without interposing any suction pipe. The problem of durability, i.e., the vibration of the supercharging device or engine acts on the connecting portion of the rotor housing and suction pipes to form a crack, is solved.

According to the present invention, the secondary air supply pipe extending outside the upper portion is connected to the attaching port formed in the front side or rear side of the collector housing, and to the secondary air channels formed in the flanges of the rotor housing. Thus, a supercharging device, that can be mounted on the cylinder head easily without largely changing the layout of the auxiliary machinery components when mounting the supercharging device on the cylinder head, can be provided.

According to the present invention, the injector attaching holes are formed in the flanges of the rotor housing. Thus, the attaching surface of the cylinder head where the flanges of the supercharging device are to be placed can be ensured without changing the layout.

According to the present invention, the first bypass channel of the collector cover is formed as a positive pressure portion which is not adversely affected by the flow of the pressurized intake air. Because of the operation of the relief valve, part of the pressurized intake air discharged to the collector flows through the first, second, and third bypass channels and is introduced into the intake port of the rotor housing. Thus, any erroneous operation of the relief valve can be prevented.

According to the present invention, the third bypass channel is formed of a bypass pipe member which is accommodated in the collector of the collector housing and through which the first and second bypass channels communicate with each other. Thus, no bypass pipe need be arranged outside the supercharging device, so that a compact supercharging device can be provided.

According to the present invention, the cooler accommodating portion is formed in the collector of the collector housing. The pressurized intake air cooled by the intercoolers accommodated in the cooler accommodating portion flows through the first, second, and third bypass channels and is introduced into the intake port of the rotor housing. Thus, the supercharging efficiency can be improved.

What is claimed is:

1. A V-engine supercharging device disposed between banks of a V-engine and mounted on a cylinder head having a suction port, characterized by comprising:

a rotor housing which accommodates a pair of rotors and has a discharge port in an upper portion thereof;

a substantially box-shaped collector housing having a suction flow inlet connected to the discharge port of said rotor housing, a collector communicating with an interior of said rotor housing through the suction flow inlet, and an upper opening;

a plurality of suction pipes which are arranged on two sides of said rotor housing in a directions of axes of said rotors at a predetermined distance and through which said collector and the suction port of said cylinder head communicate with each other;

a collector cover which covers the upper opening of said collector housing; and flanges projecting to two sides of said rotor housing in the directions of axes of said rotors and integrally connected to suction flow outlets of said suction pipes, wherein said rotor housing, collector housing, and suction pipes are integrally formed by aluminum alloy casting, and lower surfaces of said flanges are attached to an upper surface of said cylinder head.

2. A V-engine supercharging device according to claim 1, characterized by further comprising:

an attaching port formed in either one of a front side and rear side of said collector housing;

secondary air channels formed in said flanges; and a secondary air supply pipe connected to the attaching port and said secondary air channels and extending outside an upper portion of said supercharging device.

3. A V-engine supercharging device according to claim 1, characterized in that injector attaching holes are formed in said flanges.

4. A V-engine supercharging device according to claim 1, characterized by further comprising:

a first bypass channel;

a collector cover having a bypass intake port and bypass discharge port formed in a wall of an inner space that forms said first bypass channel;

a second bypass channel which is formed in said rotor housing and through which said collector of said collector housing and the intake port of said rotor housing communicate with each other;

a third bypass channel through which said first and second bypass channels communicate with each other; and a relief valve accommodated in said second bypass channel and actuated by a supercharging pressure discharged to said collector of said collector housing, wherein part of pressurized intake air discharged to said collector of said collector housing is introduced to the intake port of said rotor housing by said relief valve through said first, second, and third bypass channels.

5. A V-engine supercharging device according to claim 4, characterized in that said third bypass channel is formed of a bypass pipe member which is accommodated in said collector of said collector housing and connects said first and second bypass channels to each other.

6. A V-engine supercharging device according to claim 4, characterized by further comprising:

a suction flow inlet formed at a substantial center of said collector of said collector housing in the direction perpendicular to the axes of said rotors;

suction flow outlets formed at two end portions of said collector of said collector housing in a direction perpendicular to a rotor axial direction;

a cooler accommodating portion formed between the suction flow inlet and suction flow outlets; and an intercooler accommodated in said cooler accommodating portion, wherein pressurized intake air cooled; by said intercooler is introduced to the intake port of said rotor housing through said first, second, and third bypass channels.

* * * * *